United States Patent Office 3,424,135
Patented Jan. 28, 1969

3,424,135
SUCTION DEVICE FOR ROTARY PISTON
INTERNAL COMBUSTION ENGINE
Hiroshi Tado, Suita-shi, Japan, assignor to Yanmar Diesel Engine Co., Ltd., Osaka, Japan, a corporation of Japan
Filed Nov. 7, 1966, Ser. No. 592,408
Claims priority, application Japan, Feb. 23, 1966, 41/15,517
U.S. Cl. 123—8                                        1 Claim
Int. Cl. F02b 53/04, 55/06, 55/10

ABSTRACT OF THE DISCLOSURE

A suction device for NSU-Wankel type rotary piston, internal combustion engines having the inner sliding surface of the housing and the bearing lubricated with a fuel-air mixture containing a lubricating oil with the piston and piston bearing being cooled by the circulation of the mixture through the piston. A bypass passage is provided in the intake system to allow part of the intake mixture to be directly drawn into the working chamber of the engine thereby bypassing the piston separately from the principal portion of the intake mixture flowing through the piston. Thereby the charging efficiency of the intake mixture is raised and the engine output is improved without having any adverse affect on the cooling and lubrication of the piston and bearing.

---

This invention relates to suction devices for rotary piston internal combustion engines and more particularly for those of the type including a housing having a substantially epitrochoidal inner surface, end covers fixed to the opposite ends of said housing, an engine shaft extending through said housing and said end covers centrally thereof and having an eccentric portion within said housing, a generally triangular piston mounted on said eccentric portion of said engine shaft for rotation in the same direction as said engine shaft in the revolution ratio of 3 to 1 and having apex portions held in sliding engagement with the inner surface of said housing.

With rotary internal combustion engines of the type described, it has already been proposed to direct the engine intake including air and a fuel-lubricant mixture through the engine piston for the purpose of cooling the piston and feeding lubricant to the sliding parts thereof. Such suction system is advantageous in that it does not need any oil cooler nor oil reservoir to serve the purpose of cooling the piston and thus can be made simple in structure.

This system, however, involves some deficiencies that there is a substantial resistance to the flow of intake mixture circulating through the piston, which performs a planetary motion around the axis of the engine shaft and that the charging efficiency of the intake mixture is reduced since the mixture is heated by the piston and therefore, the engine output per unit displacement decreased.

To overcome these deficiencies, the present invention proposes to provide, in the intake system, a bypass passage which has an inlet port of necessary and sufficient area and gives a minimum of flow resistance to allow part of the intake mixture to be directly drawn into the engine housing bypassing the piston. It is to be understood that the flow ratio between the branched stream flowing through the bypass passage and the main stream flowing through the piston is maintained in an appropriate range so that the cooling of the piston and the bearing lubrication can be effected satisfactorily.

Generally, it is recommended to determine the cross-sectional area of the bypass passage and the area of the inlet port thereto so that the flow ratio between the bypass and main passages is maintained between approximately 20% and 50%. By so doing, it has been found that an output increase of approximately 20% to 50% can be obtained compared to the conventional system in which the whole of intake mixture is sucked in through the piston, and thus the objective of improving the engine output can be attained without losing the simplicity in structure.

The foregoing and other objects, features and advantages of the present invention will become apparent from the following description when taken in conjunction with the accompanying drawings, in which FIG. 1 is a vertical axial cross-sectional view of a rotary combustion engine embodying the present invention;

Figure 1:
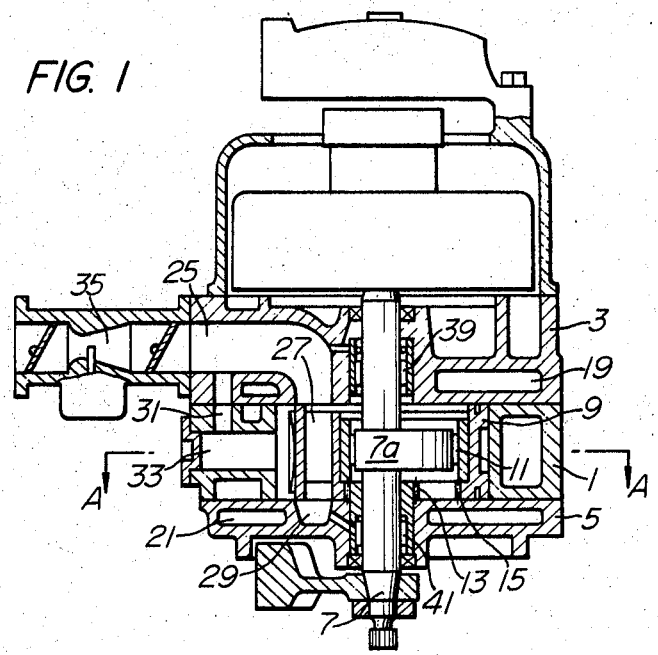
Figure 2:
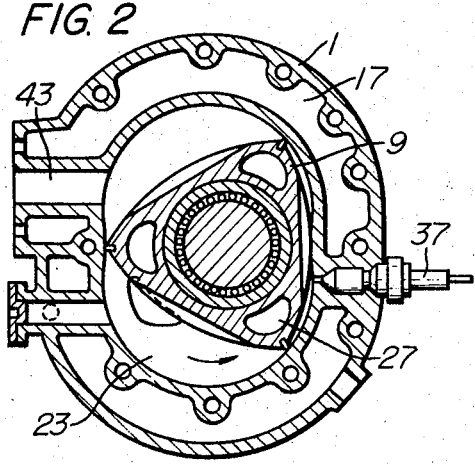
FIG. 2 is a cross-sectional view taken along the line A—A in FIG. 1.
Figure 3:
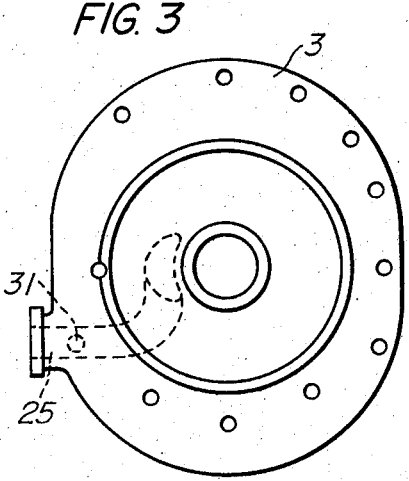
FIGS. 3 and 4 are top plan views of the top and bottom end covers covering the engine housing showing in FIG. 1.
Figure 4:
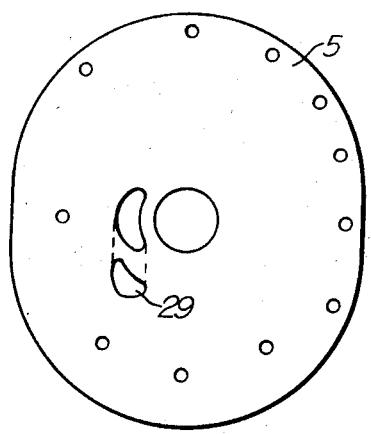
Figure 5:
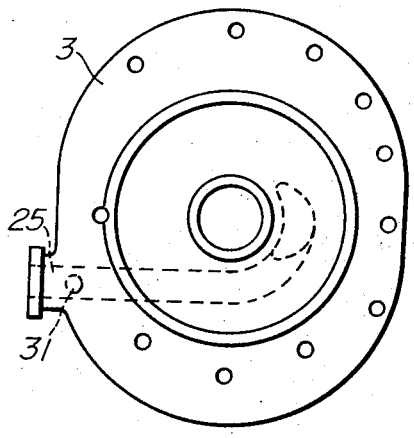
FIGS. 5 and 6 are views similar to FIGS. 3 and 4, respectively showing modified forms of the end covers.
Figure 7:
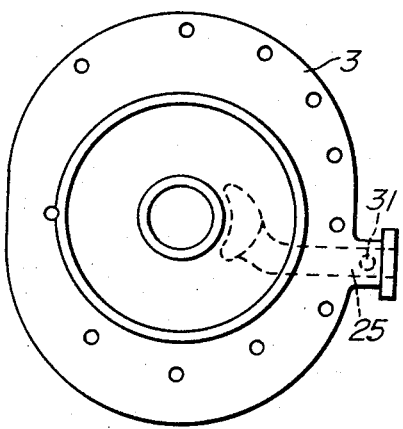
FIG. 7 illustrates a further modification of the top and cover.
Figure 6:
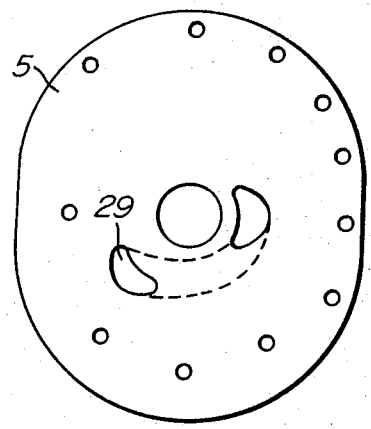

Referring first to FIGS. 1 and 2, reference numeral 1 indicates a housing having a substantially epitrochoidal inner surface, with end covers 3 and 5 fixed to the opposite ends of said housing 1. An engine shaft 7 extends through the housing 1 and end covers 3 and 5 centrally thereof and includes an eccentric portion 7a. A rotary piston 9 is mounted on said eccentric shaft portion 7a through the medium of a bearing 11 and carries an internal gear 15, which is in mesh with a gear 13 affixed to the inside of one of the end covers 5. The piston 9 is thus rotatable in the same direction as the engine shaft 7 in a predetermined revolution ratio with respect thereto.

A water jacket 17 is formed in the engine housing 1 and water jackets 19 and 21 formed in the end covers 3 and 5, respectively. Water is circulated through these water jackets for the cooling purpose. In the case of the air-cooled type of engine, cooling fins are employed in place of the jackets and cooling air is led to the fins.

The piston 9 has arcuate side faces which together with the epitrochoidal inner surface of the housing 1 define working chambers. A suction passage 25 is formed in one of the end covers 3 and passages 27 and 29 formed in the piston 9 and the other end cover 5, respectively. In operation, the pressure in each of these chambers is reduced to vacuum as its volume is increased as at 23. In this manner, a fuel-air mixture containing lubricant oil can be drawn from the outside of the engine into the working chambers. As illustrated, bypass passage 31, 33 is formed in the engine housing 1 and end cover 3 to connect the suction passage 25 directly with the working chamber 23. With this arrangement, it is noted that part of the intake mixture can be drawn directly into the working chamber through the bypass passage, which gives a minimum resistance to the flow of mixture.

On the other hand, shaft bearings 39, 41 mounted in the end covers 3 and 5 and the bearing 11 referred to above are lubricated when the intake mixture flows through the passages 25, 29 formed in end covers 3 and 5 through passage 27 in the piston 9 as the mixture is previously blended with lubricant oil. Reference numeral 35 indicates a carburetor 37, an ignition plug 43 and an exhaust port.

The cooling of the piston is effected principally by the heat transfer through gas seals mounted on the piston in sliding engagement with the end covers and partly by the heat dissipation into the mixture passing through the piston. This eliminates the need for piston coolant and means for cooling such and for means of feeding bearing lubricant and a lubricant reservoir.

The formation of the bypass passage 31, 33 in connection with the main intake passage 25 is specifically illustrated in FIGS. 3 to 7.

What is claimed is:

1. In a rotary piston internal combustion engine of the type including a housing having a substantially epitrochoidal inner surface, end covers fixed to the opposite ends of said housing, an engine shaft extending through said housing and said end covers centrally thereof and having an eccentric portion within said housing, and a generally triangular piston mounted on said engine shaft for rotation in the same direction as said engine shaft in the revolution ratio of 3 to 1 and having apex portions held in sliding engagement with the inner surface of said housing, a working chamber defined by said inner surface, said covers, and said piston, a suction device comprising a main intake passage and an auxiliary intake passage branching off therefrom, both of said passages communicating with said working chamber, means for supplying air and a fuel-lubricant mixture to said passages, and passage means in said piston intermittently communicating with said main intake passage to permit flow therethrough of said air and fuel-lubricant mixture whereby said mixture to be sucked into the working chamber of the engine is divided into two flows, one flow through the main passage being drawn into the working chamber after passing through the piston and the other flow through the auxiliary passage being drawn directly into the working chamber.

References Cited

UNITED STATES PATENTS

| | | | |
|---|---|---|---|
| 3,265,046 | 9/1966 | Paschke | 123—8 |
| 3,319,612 | 5/1967 | Hamada | 123—8 |

JULIUS E. WEST, *Primary Examiner.*

DOUGLAS HART, *Assistant Examiner.*